United States Patent
Wu et al.

(10) Patent No.: US 9,413,260 B1
(45) Date of Patent: Aug. 9, 2016

(54) METHOD OF CURRENT CONTROL OF THREE-PHASE MODULAR MULTILEVEL CONVERTER WITH INDUCTANCE CHANGES ALLOWED

(71) Applicant: National Tsing Hua University, Hsinchu (TW)

(72) Inventors: Tsai-Fu Wu, Chiayi County (TW); Li-Chun Lin, New Taipei (TW); Xin-yu Yu, Beijing (CN)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/791,572

(22) Filed: Jul. 6, 2015

(30) Foreign Application Priority Data

Mar. 6, 2015 (TW) .............................. 104107338 A

(51) Int. Cl.
*H02M 7/00* (2006.01)
*H02M 3/335* (2006.01)
*H02M 7/08* (2006.01)

(52) U.S. Cl.
CPC .............. *H02M 7/003* (2013.01); *H02M 3/335* (2013.01); *H02M 7/08* (2013.01)

(58) Field of Classification Search
CPC .................................. H02M 7/03; H02M 7/08
See application file for complete search history.

(56) References Cited

U.S. PATENT DOCUMENTS

| 2012/0026767 A1* | 2/2012 | Inoue | H02M 7/217 363/89 |
|---|---|---|---|
| 2014/0002048 A1* | 1/2014 | Pang | H02M 11/00 323/304 |

* cited by examiner

*Primary Examiner* — Emily P Pham
(74) *Attorney, Agent, or Firm* — Jackson IPG PLLC; Demian K. Jackson

(57) ABSTRACT

Current of a three-phase multilevel modular converter (MMC) is controlled. The control is a division-summation (D-Σ) method yet uses integration to replace the two steps of division and summation. Common D-Σ characteristic equations are used for all areas. Inductance changes are considered in the characteristic equations. Current source is used to control converter. Therefore, the current of the converter can be traced to sinusoidal reference current even when the inductance changes become big. The modulation method and the capacitor-voltage balancing method are submodule unified pulse width modulation (SUPWM) and sorted voltage-balancing method, respectively. The current control directly obtains a law of the current change on each conducting module of an arm. It does not need complex sector judgments and table look-ups. Thus, the amount of computation and memory for a processor can be relatively reduced.

4 Claims, 7 Drawing Sheets

METHOD OF CURRENT CONTROL OF THREE-PHASE MODULAR MULTILEVEL CONVERTER WITH INDUCTANCE CHANGES ALLOWED

TECHNICAL FIELD OF THE INVENTION

The present invention relates to current control of MMC; more particularly, relates to a division-summation (D-Σ) method for controlling a three-phase modular multilevel converter (MMC) with inductance changes allowed.

DESCRIPTION OF THE RELATED ARTS

As an up-and-coming high-pressure multilevel converter, MMC shares DC side voltage and has modular design with low switching frequency and stress and low harmony distortion. Furthermore, its applications in high-voltage DC power supply, virtual power compensation, motor drives and low voltage ride through (LVRT) are studied. Among them, the current control of MMC is a more popular research topic.

Traditional MMC current control method is transplanted from the DC control method of two multilevel converters, where mathematical models of abc-to-dq vector conversions for the abc three phases are calculated to obtain corresponding control methods for d-axis and q-axis. (Zhao Yan; Hu Xue-hao; Tang Guang-fu; He Zhi-yuan, "A study on MMC model and its current control strategies," Power Electronics for Distributed Generation Systems (PEDG), 2010 2nd IEEE International Symposium on, vol., no., pp. 259,264, 16-18 Jun. 2010.). In a practical engineering application, when current flowing through each arm of the MMC is changed, inductance of the inductor will be significantly changed as following the current change. Such a situation of inductance change is not considered in the abc-dq conversion, so that error on current control will happen by using the DC control method of the d-q axis conversion.

In order to solve the problem for accurate current control under big inductance changes, three documents (Wu T F, Chang C H, Lin L C, et al. A D-Σ Digital Control for Three-Phase Inverter to Achieve Active and Reactive Power Injection[J]. Power Electronics, IEEE Transactions on, 2014, 31(8): 3879-3890; Wu T F, Chang C H, Lin L C, et al. Two-Phase Modulated Digital Control for Three-Phase Bidirectional Inverter With Wide Inductance Variation[J]. Power Electronics, IEEE Transactions on, 2013, 28(4): 1598-1607; Wu T F, Sun K H, Kuo C L, et al. Predictive current controlled 5-kW single-phase bidirectional inverter with wide inductance variation for dc-microgrid applications[J]. Power Electronics, IEEE Transactions on, 2010, 25(12): 3076-3084) provide D-Σ control methods for single-phase and three-phase converters (two-level converters). The methods consider the inductance changes under the current changes to build mathematical models of two-level converters and obtain corresponding duty ratios of all switches of each submodule in the present control cycle for controlling the three-phase MMC. But, as compared to the two-level converter, MMC is more complex, whose mathematical models have many differences. If a D-Σ control method of two-level converter is directly applied to the MMC, complex multilevel space phasor-order modulation is required with memory and calculation greatly increased in the processor.

For an existing multilevel converter, when the inductance significantly changes as the current flows through the inductor, the traditional d-q axis conversion does not consider inductance change and, therefore, error compensation would happen. As a result, mains current is easily affected by big inductance change to generate oscillation and further lead to serious distortion.

Hence, the prior arts do not fulfill all users' requests on actual use.

SUMMARY OF THE INVENTION

The main purpose of the present invention is to provide a D-Σ method for controlling a three-phase MMC with inductance changes allowed.

Another purpose of the present invention is to calculate voltages corresponding to the current changes by obtaining inductance values following the current changes and building a table in a single chip, where, with consideration of inductance changes during calculation, circuit gains are quickly adjusted to resolve mains current distortion owing to big inductance changes; the present invention does not need coordinate conversions, sector judgments and directly calculates a number of conducted submodules of each arm according to a characteristic equation; and the present invention has a simple process, a small amount of calculation and an easy digital control.

To achieve the above purposes, the present invention is a method of current control of a three-phase MMC with inductance changes allowed, where the method is execution in a device of the three-phase MMC to control the three-phase MMC and the three-phase MMC has a plurality of inductance values of upper and lower arms at different phases; and the method comprises the following steps: (a) three-phase reference currents of three-phase mains side are sine functions of a fundamental frequency; after feedback voltages and feedback currents of the three-phase mains side are separately obtained through a voltage feedback circuit and a current feedback circuit, the reference currents in a next control cycle of the three-phase mains side are separately subtracted by corresponding ones of the feedback currents in a present control cycle to obtain current changes of corresponding inductors in the present control cycle; through storing changes of inductance values of the upper and lower arms into a single chip as following the current changes, equivalent inductance values of the mains side are calculated with the corresponding inductance values of three phases of the MMC; (b) an average number of submodules conducted by each one of the upper and lower arms in the present control cycle is calculated by using a digital division-summation (D-Σ) control method; (c) a law of number change of submodules of each one of the upper and lower arms in the present control cycle is figured out by using a method of submodule unified pulse width modulation (SUPWM); and (d) corresponding duty ratios of all switches of each one of the submodules in the present control cycle are calculated by using a voltage-balancing method based on sorted submodule capacitances and the method is looped to execute step (a). Accordingly, a novel method of current control of a three-phase MMC with inductance changes allowed is obtained.

BRIEF DESCRIPTION OF THE DRAWING

The present invention will be better understood from the following detailed description of the preferred embodiment according to the present invention, taken in conjunction with the accompanying drawings, in which.

DESCRIPTION OF THE PREFERRED EMBODIMENT

Figure 1:
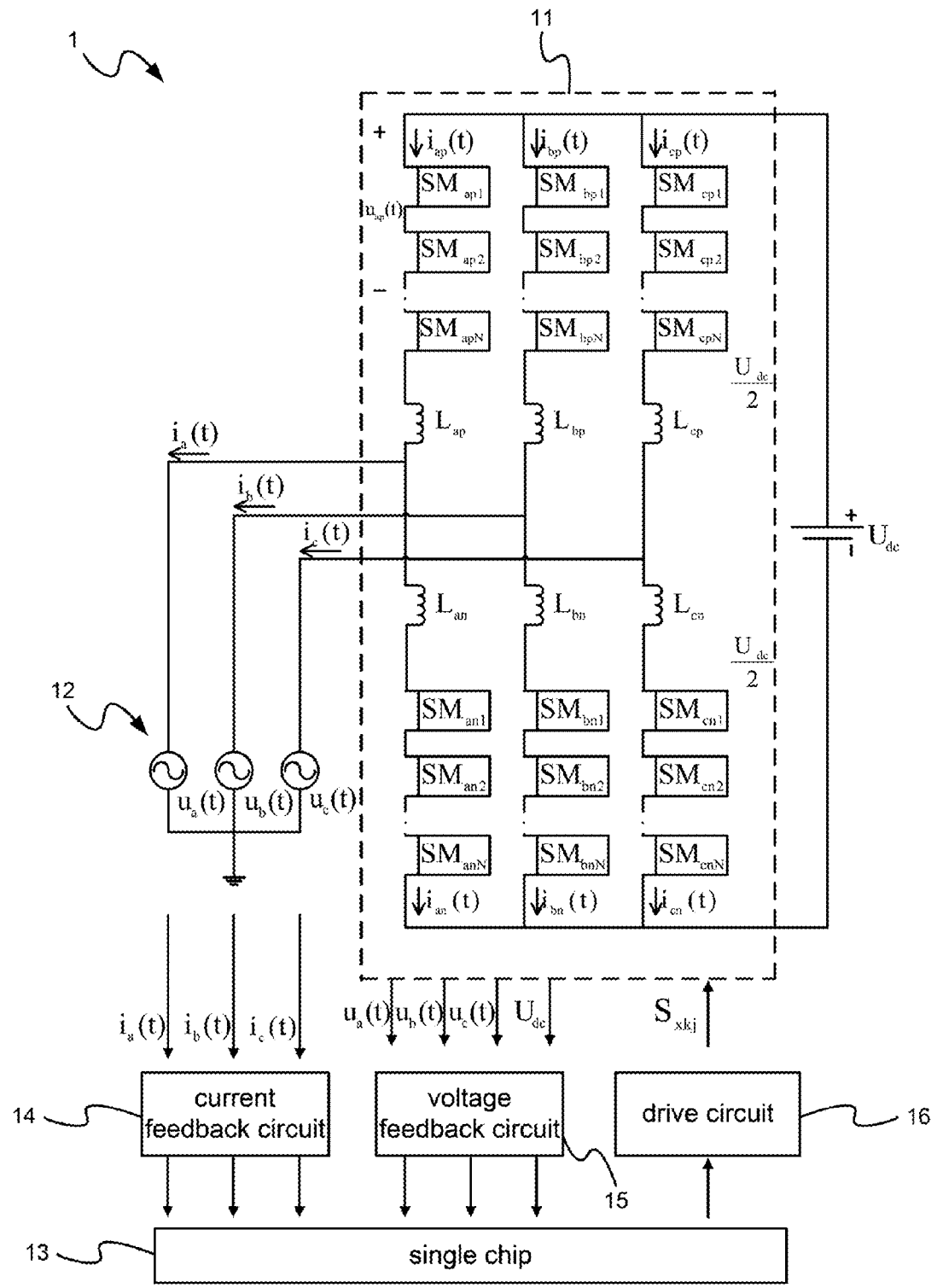
FIG. 1 is the view showing the equivalent circuit and the control blocks of the preferred embodiment according to the present invention.
Figure 2:
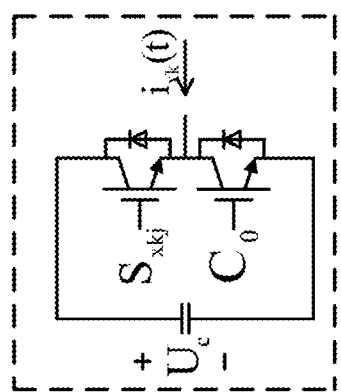
FIG. 2 is the view showing the submodule of the three-phase modular multilevel converter (MMC)
Figure 3:
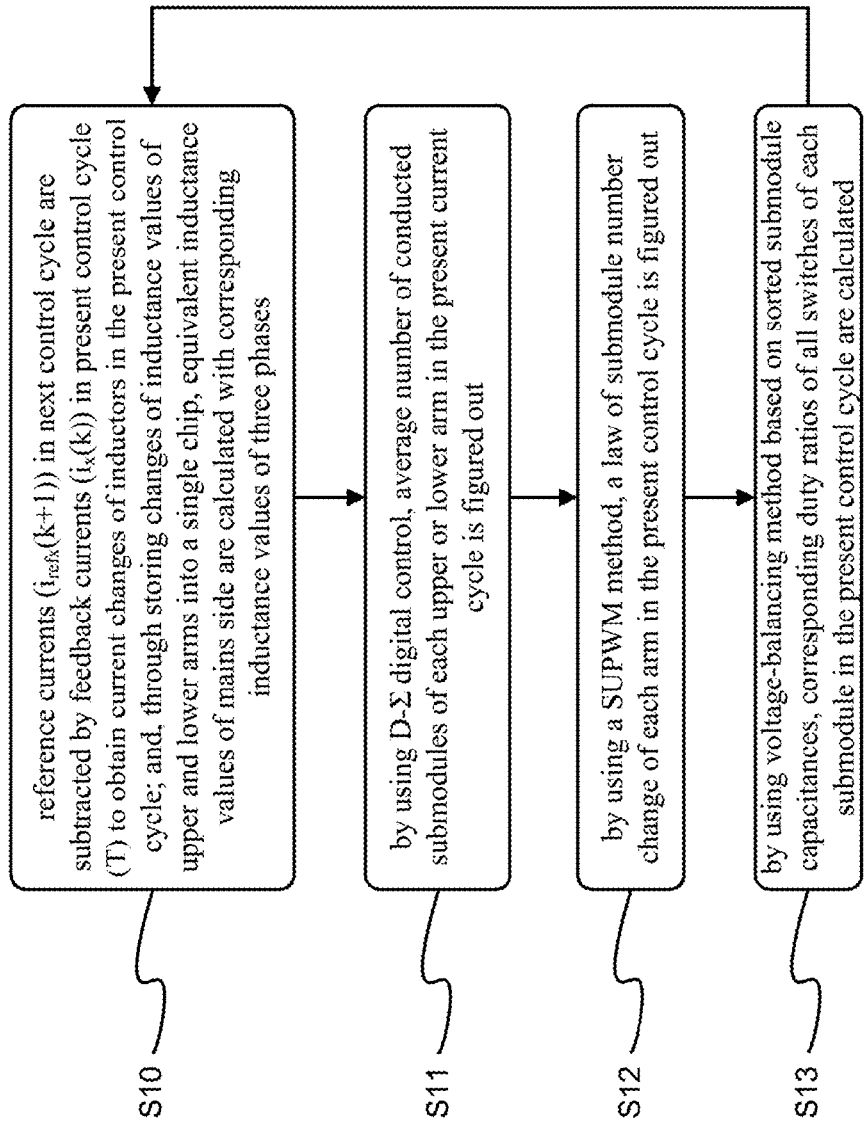
FIG. 3 is the flow view showing the control of the three-phase MMC based on division-summation (D-Σ)

The following description of the preferred embodiment is provided to understand the features and the structures of the present invention.

Please refer to FIG. 1-FIG. 5, which are a view showing an equivalent circuit and control blocks of a preferred embodiment according to the present invention; a view showing a submodule of a three-phase MMC; a flow view showing control of the three-phase MMC based on D-Σ; a view showing control blocks in an S field for controlling the three-phase MMC; and a view showing a law of number change of submodules of an arm in a control cycle. As shown in the figures, the present invention is a method of current control of a three-phase MMC with inductance changes allowed, where the method is execution in a device of three-phase MMC to control the three-phase MMC. The device controlling the three-phase MMC comprises the three-phase MMC 11, a city grid circuit 12, a single chip 13, a current feedback circuit 14, a voltage feedback circuit 15 and a drive circuit 16.

The three-phase MMC 11 has a plurality of inductance values of upper and lower arms of different phases.

The city grid circuit 12 is electrically connected with the three-phase MMC 11 to receive currents converted by and outputted from the three-phase MMC 11.

The single-chip 13 is electrically connected with the drive circuit 16, the current feedback circuit 14, and the voltage feedback circuit 15.

The current feedback circuit 14 is electrically connected with the city grid circuit 12 and the single-chip 13 for receiving the currents outputted from the city grid circuit 12 and generating feedback currents accordingly.

The voltage feedback circuit 15 is electrically connected with the three-phase MMC 11, the city grid circuit 12 and the single-chip 13 to receive voltages outputted from the city grid circuit 12 and generating a feedback voltage accordingly while receiving voltages of DC side for the three-phase MMC 11.

The drive circuit 16 is electrically connected with the three-phase MMC 11 and the single chip 13 for driving the three-phase MMC 11.

On using, the present invention comprises the following steps:

(a) Step S10: According to Eq. 1, three-phase currents ($i_a$, $i_b$, $i_c$) of three-phase mains side for the three-phase MMC 11 are calculated to obtain reference currents ($i_{aref}$, $i_{bref}$, $i_{cref}$), which are sine functions of a fundamental frequency. After feedback voltages ($u_{ab}$, $u_{bc}$, $u_{ca}$) and feedback currents ($i_a$, $i_b$, $i_c$) of the mains side are separately obtained through the voltage feedback circuit 15 and the current feedback circuit 14, the reference currents in a next control cycle of the three-phase mains side for the three-phase MMC 11 are separately subtracted by corresponding ones of the feedback currents in a present control cycle (T) to obtain current changes ($\Delta i_a$, $\Delta i_b$, $\Delta i_c$) of corresponding inductors in the present control cycle according to Eq. 2. Therein, since inductance values have big changes as the currents flow through the corresponding inductors, changes of inductance value are taken into consideration for achieving a precise control of the currents. Through storing changes of the inductance values ($L_{ap}$, $L_{bp}$, $L_{cp}$, $L_{an}$, $L_{bn}$, $L_{cn}$) of the upper and lower arms into the single chip 13 with off-line measurements as following changes of the currents, equivalent inductance values ($L_a$, $L_b$, $L_c$) of the mains side are calculated according to Eq. 3 with the corresponding inductance values of three phases.

$$\begin{cases} i_{aref} = I_M \sin(\omega t) \\ i_{bref} = I_M \sin(\omega t - 120°) \\ i_{cref} = I_M \sin(\omega t + 120°) \end{cases} \quad \text{Eq. 1}$$

Therein, $i_a(k)$, $i_b(k)$ and $i_c(k)$ are sampled values of reference currents of phase a, b and c of connected grid in the present control cycle, whose amplitude is $I_M$.

$$\begin{cases} \Delta i_a = i_{aref}(k+1) - i_a(k) \\ \Delta i_b = i_{bref}(k+1) - i_b(k) \\ \Delta i_c = i_{cref}(k+1) - i_c(k) \end{cases} \quad \text{Eq. 2}$$

Therein, $i_{aref}(k+1)$, $i_{bref}(k+1)$ and $i_{cref}(k+1)$ are sampled values of the reference currents of the phase a, b and c of the connected grid in the next control cycle; $i_a$, $i_b$, $i_c$ are feedback values of the reference currents of the phase a, b and c of the connected grid in the present control cycle; and, $\Delta i_a$, $\Delta i_b$ and $\Delta i_c$ are to-be-traced deviation values of currents of the phase a, b and c.

$$\begin{cases} L_a = \dfrac{L_{ap} L_{an}}{L_{ap} + L_{an}} \\ L_b = \dfrac{L_{bp} L_{bn}}{L_{bp} + L_{bn}} \\ L_c = \dfrac{L_{cp} L_{cn}}{L_{cp} + L_{cn}} \end{cases} \quad \text{Eq. 3}$$

Therein, $L_a$, $L_b$, $L_c$ are equivalent inductances of the phase a, b and c; $L_{ap}$, $L_{bp}$, $L_{cp}$ are the inductances of the upper arms of the phase a, b and c; and, $L_{an}$, $L_{bn}$, $L_{cn}$ are the inductance of the upper arms of the phase a, b and c.

(b) Step S11: According to Eq. 4(a) and Eq. 4(a), by using a D-Σ digital control, an average number of conducted submodules of each upper or lower arm in the present current cycle is figured out.

For the upper arms of three phases:

$$\begin{cases} \overline{N}_{ap} = \int_T N_{ap}(t) dt / T = \dfrac{N}{2} - \dfrac{2u_{ab} + u_{bc}}{3U_c} - \dfrac{(2L_a + L_c)\Delta i_a}{3U_c T} + \\ \qquad \dfrac{(L_b - L_c)\Delta i_b}{3U_c T} \\ \overline{N}_{bp} = \int_T N_{bp}(t) dt / T = \dfrac{N}{2} + \dfrac{u_{ab} + u_{bc}}{3U_c} - \dfrac{(L_a - L_c)\Delta i_a}{3U_c T} + \\ \qquad \dfrac{(2L_b + L_c)\Delta i_b}{3U_c T} \\ \overline{N}_{cp} = \int_T N_{cp}(t) dt / T = \dfrac{N}{2} + \dfrac{u_{ab} + u_{bc}}{3U_c} + \dfrac{(L_a + 2L_c)\Delta i_a}{3U_c T} + \\ \qquad \dfrac{(L_b + 2L_c)\Delta i_b}{3U_c T}. \end{cases} \quad \text{Eq. 4(a)}$$

For the lower arms of three phases:

$$\begin{cases} \overline{N}_{an} = N - \overline{N}_{ap} \\ \overline{N}_{bn} = N - \overline{N}_{bp} \\ \overline{N}_{cn} = N - \overline{N}_{cp} \end{cases} \quad \text{Eq. 4(b)}$$

Therein, $N_{ap}$, $N_{bp}$, $N_{cp}$ are the conducted submodules of the upper arms of the phase a, b and c; $N_{an}$, $N_{bn}$, $N_{cn}$ are the conducted submodules of the lower arms of the phase a, b and c; N is the total number of submodules; $u_{ab}$ and $u_{bc}$ are voltages of mains lines between phases a,b and b,c; $u_{ab}=u_{ao}-u_{bo}$ and $u_{bc}=u_{bo}-u_{co}$ while $u_{ao}$, $u_{bo}$ and $u_{co}$ are feedback values of voltages of the phase a, b and c in the present current cycle; $U_c$ is the rated voltage of capacitor of submodule; and, T is the time length of control cycle.

Figure 5:
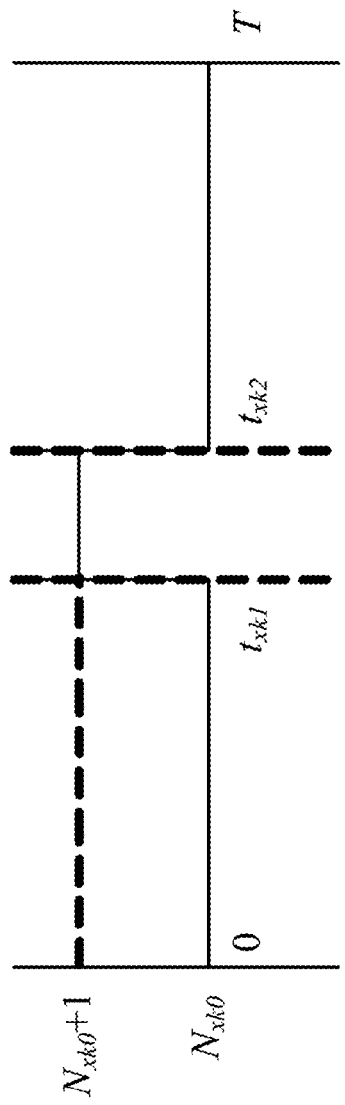
FIG. 5 is the view showing the law of number change of the submodules of the arm in the control cycle.

(c) Step S12: According to Eq. 5(a)~Eq. 5(f), by using a method of submodule unified pulse width modulation (SUPWM), a law of number change of submodules of each arm in the present control cycle is figured out as shown in FIG. 5.

For the upper arms of three phases:

$$\begin{cases} N_{ap0} = \text{floor}(\overline{N}_{ap}) \\ N_{bp0} = \text{floor}(\overline{N}_{bp}) \\ N_{cp0} = \text{floor}(\overline{N}_{cp}) \end{cases} \quad \text{Eq. 5(a)}$$

$$\begin{cases} t_{ap1} = (1 - \overline{N}_{ap} + N_{ap0})T/2 \\ t_{bp1} = (1 - \overline{N}_{bp} + N_{bp0})T/2 \\ t_{cp1} = (1 - \overline{N}_{cp} + N_{cp0})T/2 \end{cases} \quad \text{Eq. 5(b)}$$

$$\begin{cases} t_{ap2} = (1 + \overline{N}_{ap} - N_{ap0})T/2 \\ t_{bp2} = (1 + \overline{N}_{bp} - N_{bp0})T/2 \\ t_{cp2} = (1 + \overline{N}_{cp} - N_{cp0})T/2 \end{cases} \quad \text{Eq. 5(c)}$$

For the lower arms of three phases:

$$\begin{cases} N_{an0} = \text{floor}(\overline{N}_{an}) \\ N_{bn0} = \text{floor}(\overline{N}_{bn}) \\ N_{cn0} = \text{floor}(\overline{N}_{cn}) \end{cases} \quad \text{Eq. 5(d)}$$

$$\begin{cases} t_{an1} = (1 - \overline{N}_{an} + N_{an0})T/2 \\ t_{bn1} = (1 - \overline{N}_{bn} + N_{bn0})T/2 \\ t_{cn1} = (1 - \overline{N}_{cn} + N_{cn0})T/2 \end{cases} \quad \text{Eq. 5(e)}$$

$$\begin{cases} t_{an2} = (1 + \overline{N}_{an} - N_{an0})T/2 \\ t_{bn2} = (1 + \overline{N}_{bn} - N_{bn0})T/2 \\ t_{cn2} = (1 + \overline{N}_{cn} - N_{cn0})T/2 \end{cases} \quad \text{Eq. 5(f)}$$

Therein, function floor(x) is rounded down to take a maximum integer not greater than parameter x.

(d) Step S13: At last, by using a voltage-balancing method based on sorted submodule capacitances, corresponding duty ratios of all switches of each submodule in the present control cycle are calculated for controlling the three-phase MMC. Therein, the three-phase MMC converts electricity between the DC side and the mains side according to the duty ratios of all switches of each submodule.

Thus, a novel method of current control of a three-phase MMC with inductance changes allowed is obtained.

Figure 4:
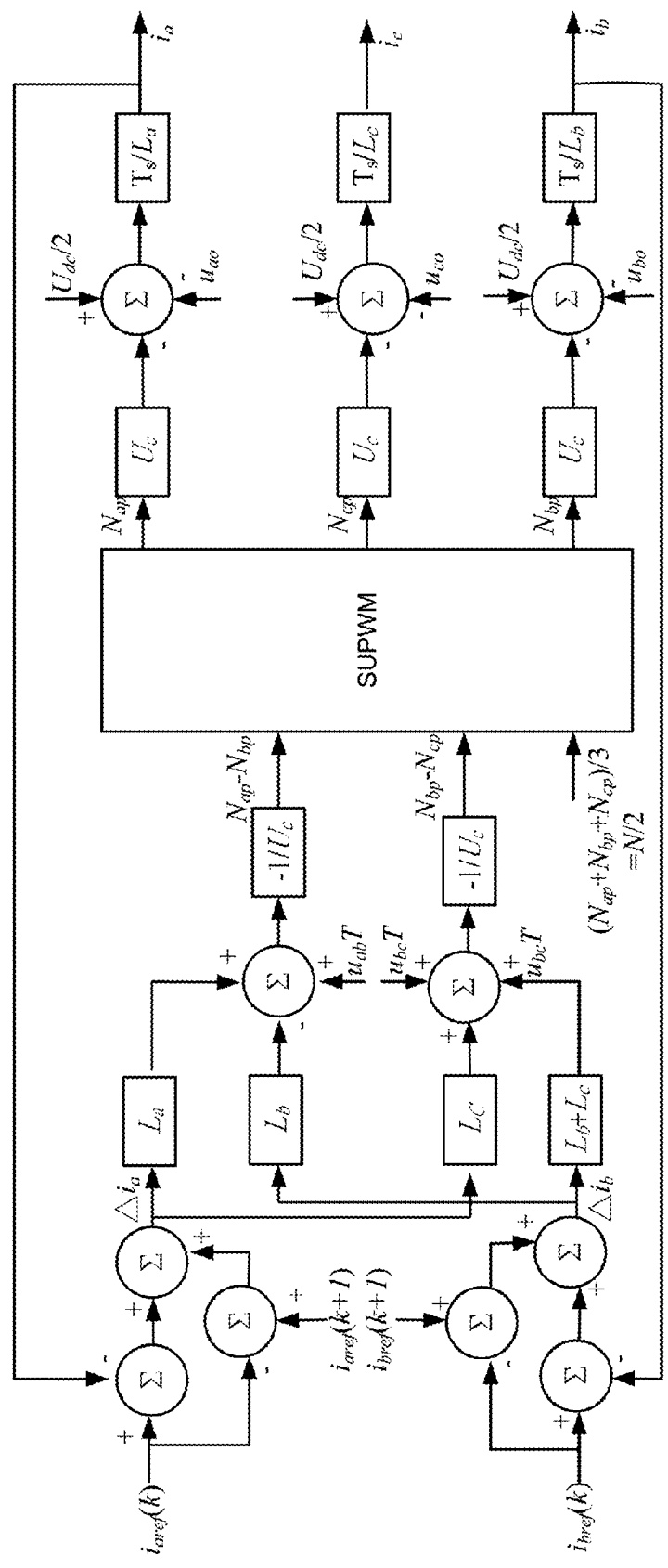
FIG. 4 is the view showing the control blocks in the S field for controlling the three-phase MMC.

In FIG. 4, the traditional method controls current according to the dq-axis conversion; yet, the present invention directly controls current under the abc coordinates after obtaining feedback values of voltages and currents through feedback circuits.

In FIG. 5, in the present control cycle, a low of change of submodule number ($N_{xk}$) of an arm (x phase k arm, x=a,b,c) is shown. The number of submodules for the arm is changed twice in the present control cycle, where $N_{xk0}$ is changed into $N_{xk0}+1$ at time $t_{xk1}$ and $N_{xk0}+1$ is changed into $N_{xk0}$ at time $t_{xk2}$.

Figure 6A:
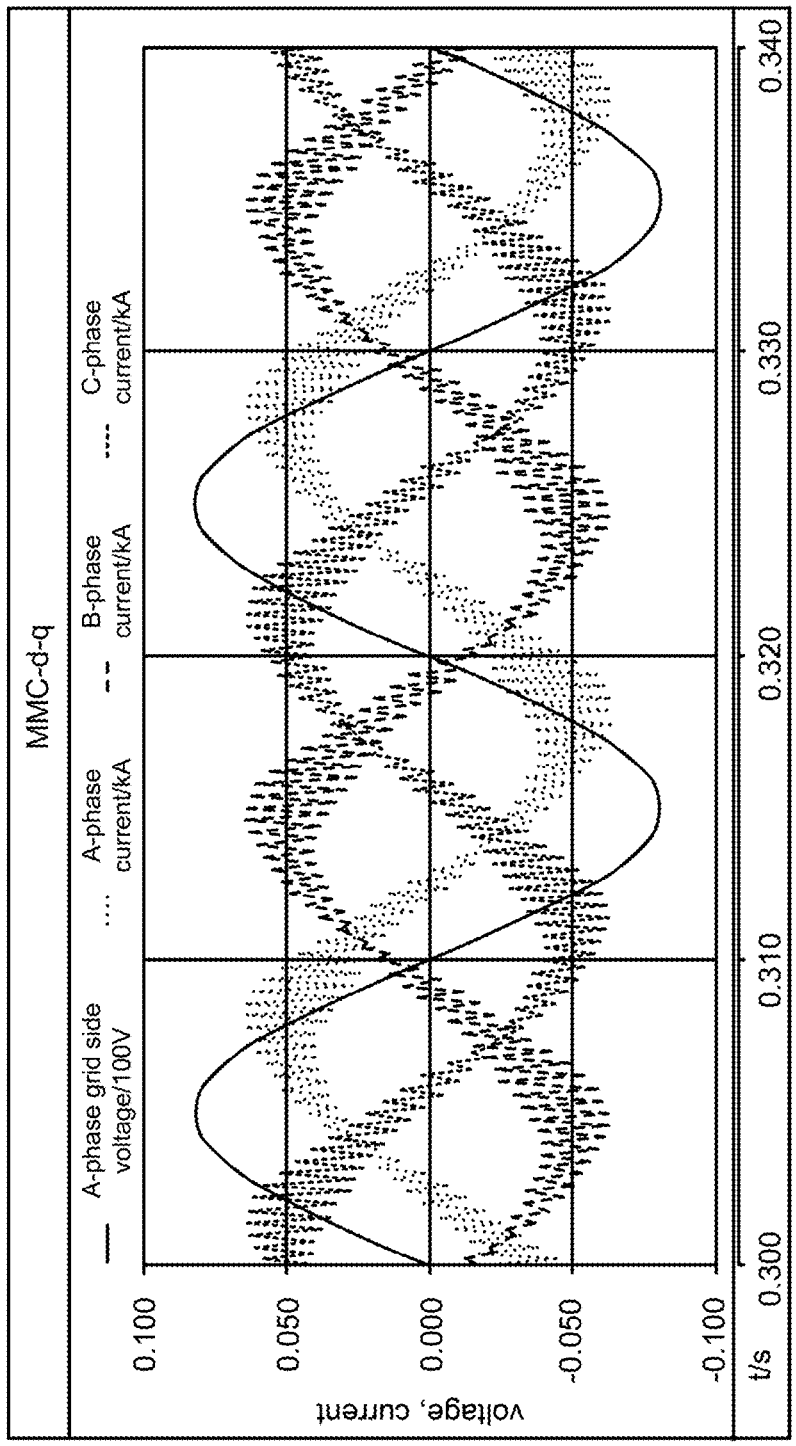
FIG. 6A and FIG. 6B are the views showing the simulated waveforms of the mains currents and those of the A-phase mains voltage under the parallel connection with mains.
Figure 6B:
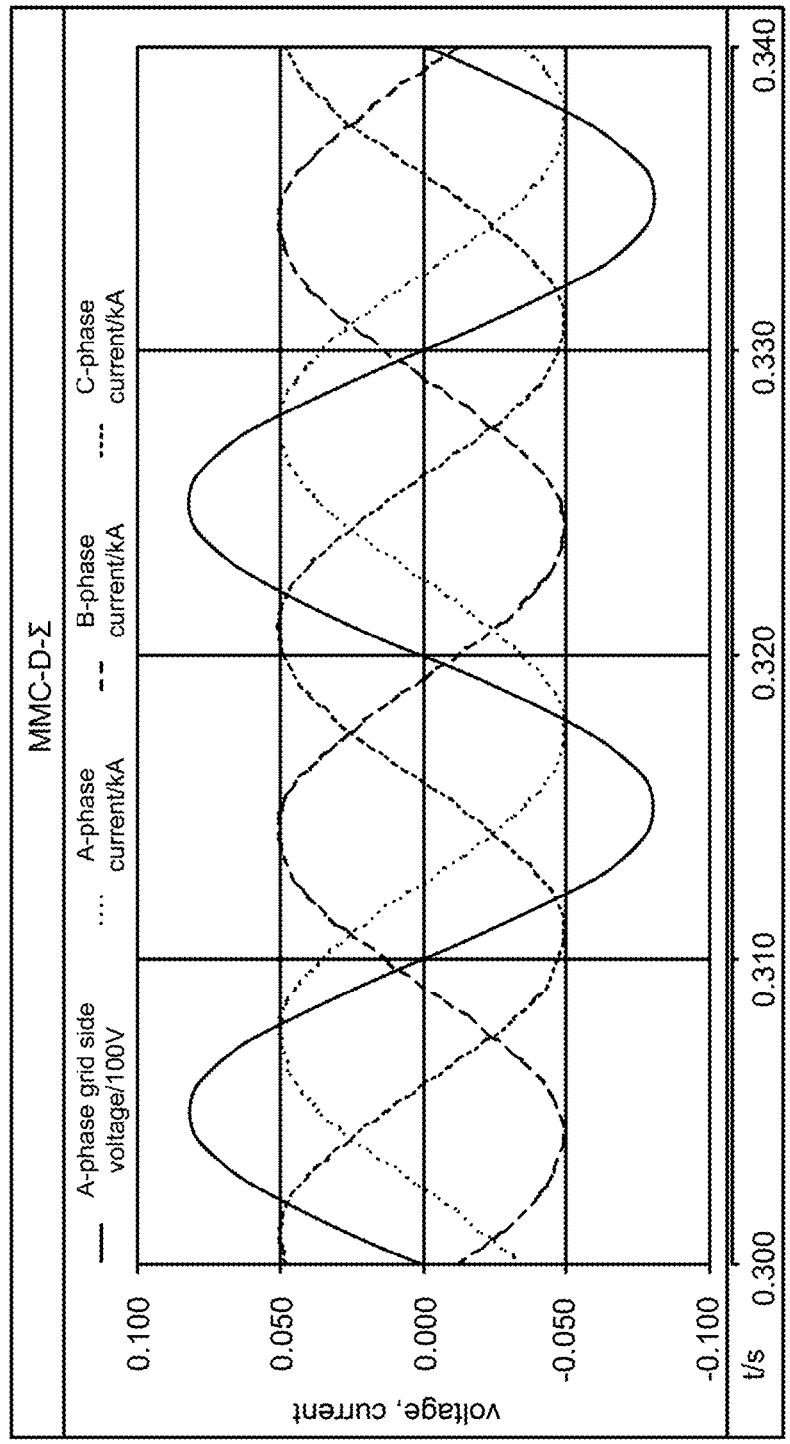

Please refer to FIG. 6A and FIG. 6B, which are views showing simulated waveforms of mains currents and those of an A-phase mains voltage under a parallel connection with mains. As shown in the figure, under consideration of big inductance changes, a software of PSCAD/EMTDC is used for simulation with inductance parameters changed as following big current changes (simulation conditions are shown in Table 1) for showing waveforms of mains currents ($i_a$, $i_b$, $i_c$) of the mains side and mains voltages at A phase outputted from the three-phase MMC, where the current unit is kA, the voltage unit is 100V and the time unit is s. On using the traditional method of dq-axis conversion control, the mains currents ($i_a$, $i_b$, $i_c$) are severely affected by the big inductance changes with a total distortion of 17.2% as shown in FIG. 6A. Yet, as shown in FIG. 6B, on using the present invention, the mains currents ($i_a$, $i_b$, $i_c$) have good sine waves with a reduced total distortion of 1.4%, which proves that the present invention can effectively control mains currents and improve grid current harmonics under big inductance changes.

TABLE 1

| Parameter | Value |
| --- | --- |
| submodule capacitance $C_0$ | 5000 μF |
| submodule number of arm N | 8 |
| voltage amplitude of phase at AC side $U_m$ | 3.266 kV |
| voltage of DC side $U_{dc}$ | 2 kV |
| Control cycle T | 0.0002 s |
| Inductance-change range | 4-10 mH |
| distortion of current harmonics by dq-axis conversion control | 17.2% |
| distortion of current harmonics by D-Σ control | 1.4% |

The present invention is a D-Σ control method suitable for MMC. The control method uses integration instead of two-step calculations of division and summation for obtaining common characteristic D-Σ equations in all areas. Inductance changes are considered in the characteristic equations for control, where converters are controlled by current sources so that the currents of the converters can be traced to sine-wave reference currents on having big inductance changes. The modulation method and the capacitor-voltage balancing method are SUPWM and sorted voltage-balancing method, respectively. A law of number change of submodules conducted by each arm is directly figured out through the control algorithm without complex sector judgments and table look-ups for relatively reducing computation and memory of the processor.

To sum up, the present invention is a method of current control of a three-phase MMC with inductance changes allowed, where inductance values following current changes are obtained; by building a table in a single chip, voltages corresponding to the current changes are calculated; with consideration of inductance changes during calculation, circuit gains are quickly adjusted to resolve mains current distortion owing to big inductance changes; the present invention does not need coordinate conversions, sector judgments and directly calculates a number of conducted submodules of each arm according to a characteristic equation; and the present invention has a simple process, a small amount of calculation and an easy digital control.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of current control of a three-phase modular multilevel converter (MMC), wherein the method is execution in a device of the three-phase MMC to control the three-phase MMC and the three-phase MMC has a plurality of inductance values of upper and lower arms at different phases; and wherein the method comprises the following steps:

(a) three-phase reference currents of three-phase mains side are sine functions of a fundamental frequency; after feedback voltages and feedback currents of said three-phase mains side are separately obtained through a voltage feedback circuit and a current feedback circuit, said reference currents in a next control cycle of said three-phase mains side are separately subtracted by corresponding ones of said feedback currents in a present control cycle to obtain current changes of corresponding inductors in said present control cycle; through storing changes of inductance values of said upper and lower arms into a single chip as following said current changes, equivalent inductance values of said mains side are calculated with said corresponding inductance values of three phases of the MMC;

(b) an average number of submodules conducted by each one of said upper and lower arms in said present control cycle is calculated by using a digital division-summation (D-Σ) control method;

(c) a law of number change of submodules of each one of said upper and lower arms in said present control cycle is figured out by using a method of submodule unified pulse width modulation (SUPWM); and (d) corresponding duty ratios of all switches of each one of said submodules in said present control cycle are calculated by using a voltage-balancing method based on sorted submodule capacitances and the method is looped to execute step (a).

2. The method according to claim 1, wherein, in step (a), said equivalent inductance values of said mains side is obtained by the following equation:

$$\begin{cases} L_a = \dfrac{L_{ap} L_{an}}{L_{ap} + L_{an}} \\ L_b = \dfrac{L_{bp} L_{bn}}{L_{bp} + L_{bn}} \\ L_c = \dfrac{L_{cp} L_{cn}}{L_{cp} + L_{cn}} \end{cases},$$

wherein $L_a$, $L_b$ and $L_c$ are respectively equivalent inductance values of phase a, b and c; $L_{ap}$, $L_{bp}$ and $L_{cp}$ are respectively said inductance values of upper arms of phase a, b and c; and $L_{an}$, $L_{bn}$ and $L_{cn}$ are respectively said inductance values of lower arms of phase a, b and c.

3. The method according to claim 1, wherein said device executing the method comprises:

a drive circuit, wherein said drive circuit drives the three-phase MMC;

a current feedback circuit, wherein said current feedback circuit receives currents of said three-phase mains side to generate feedback currents accordingly;

a voltage feedback circuit, wherein said voltage feedback circuit receives voltages of said three-phase mains side to generate feedback voltages accordingly while receiving voltages of direct-current (DC) side; and a single chip, wherein said single chip is electrically connected to said drive circuit, said current feedback circuit and said voltage feedback circuit; said single chip receives said feedback currents and said feedback voltages of said three-phase mains side and said voltages of said DC side; reference currents in said next control cycle of said three-phase mains side are separately subtracted by corresponding ones of said feedback currents in said present control cycle to obtain changes of corresponding current values of inductors in said present control cycle; through storing changes of inductance values of said upper and lower arms into a single chip as following said changes of current values of inductor, equivalent inductance values of said mains side are calculated with corresponding ones of said inductance values of three phases of the MMC; corresponding duty ratios of all switches of each one of said submodules in said present control cycle are calculated by using a voltage-balancing method based on sorted submodule capacitances; and electricity is switched between said mains side and said DC side according to said duty ratios of all switches of each one of said submodules.

4. The method according to claim 3, wherein said single chip obtains said equivalent inductance values of said mains side by the following equation:

$$\begin{cases} L_a = \dfrac{L_{ap}L_{an}}{L_{ap}+L_{an}} \\ L_b = \dfrac{L_{bp}L_{bn}}{L_{bp}+L_{bn}} \\ L_c = \dfrac{L_{cp}L_{cn}}{L_{cp}+L_{cn}} \end{cases},$$

wherein $L_a$, $L_b$ and $L_c$ are respectively equivalent inductance values of phase a, b and c; $L_{ap}$, $L_{bp}$ and $L_{cp}$ are respectively said inductance values of upper arms of phase a, b and c; and $L_{an}$, $L_{bn}$ and $L_{cn}$ are respectively said inductance values of lower arms of phase a, b and c.

\* \* \* \* \*